G. B. VALENTINE
Chain-Pump.
No. 202,896.   Patented April 23, 1878.
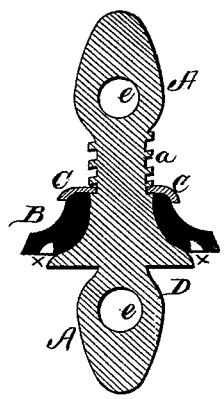
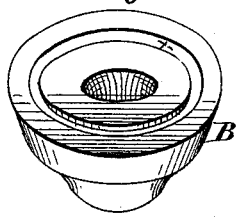
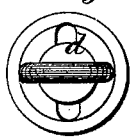
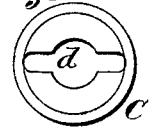
WITNESSES
INVENTOR
G. B. Valentine
ATTORNEYS

UNITED STATES PATENT OFFICE.

GORDON B. VALENTINE, OF ANNVILLE, PENNSYLVANIA.

IMPROVEMENT IN CHAIN-PUMPS.

Specification forming part of Letters Patent No. 202,896, dated April 23, 1878; application filed October 20, 1877.

*To all whom it may concern:*

Be it known that I, GORDON B. VALENTINE, of Annville, in the county of Lebanon, and in the State of Pennsylvania, have invented certain new and useful Improvements in Adjustable Rubber Buckets for Chain-Pumps; and do hereby declare that the following is a full, clear, and exact description thereof, reference being had to the accompanying drawings, and to the letters of reference marked thereon, making a part of this specification.

The nature of my invention consists in the peculiar construction of the several parts, hereinafter described, for forming a pump-bucket for chain-pumps, as will be set forth.

To enable those skilled in the art to make and use my invention, I will proceed to describe its construction and operation.

In the accompanying drawings, making part of this specification, Figure 1 represents a longitudinal section; Fig. 2, a top view; Fig. 3, a view of the washer, and Fig. 4 a perspective of the rubber.

In the figures, A represents the link, which is composed of a bar of iron, and provided with the eyes *e e* near each end, also with a screw-thread, *a*, upon its body, and also with the annular flange or shoulder D.

B represents the rubber, which is somewhat in conical shape, as seen, and which has a hole through its center, through which hole the link A passes. The under side of this rubber, near its outer edge, is provided with a groove, *x x*. The object of this groove is that, in cutting away a portion of the rubber, the edges which press against the water-tube are more pliable, and thus better accommodate themselves to the inequalities of the tube, when any exist.

The rubber B is held down upon the annular flange D by means of a washer, C. This washer has an oblong opening cut through it, as seen at *d*, which allows it to pass over the flattened end of the link, and then to be of such size at its middle as to catch under the threads at *a* on the body of the link.

The rubber is compressed between the flange D and the washer C by the use of the screw-thread at *a*, and is thus made to always fit the tube snugly. In case of wear, it is only necessary to turn the washer up, and thus compress the rubber to fit the tube. This bucket is used in the same manner as all buckets of this character are.

Having thus fully described my invention, what I claim as new, and desire to secure by Letters Patent, is—

In a chain-pump bucket, the combination of the link A, formed with the eyes *e e*, screw-thread *a*, and annular flange D, the conical rubber B, with annular groove *x* in its flat face, and the washer C, formed with the elongated opening *d*, all constructed substantially as and for the purposes herein set forth.

In testimony that I claim the foregoing I have hereunto set my hand this 17th day of October, 1877.

GORDON B. VALENTINE.

Witnesses:
 JOHN H. KINPORTS,
 ISAAC BEAVER.